United States Patent
Nakamura

(10) Patent No.: US 10,795,627 B1
(45) Date of Patent: Oct. 6, 2020

(54) IMAGE FORMING SYSTEM, PORTABLE TERMINAL, AND IMAGE FORMING METHOD THAT STORES OR TRANSMITS BROWSING INFORMATION BASED ON STORAGE COMPACITY OF A STORAGE PART

(71) Applicant: KYOCERA Document Solutions Inc., Osaka (JP)

(72) Inventor: Masayoshi Nakamura, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/393,514

(22) Filed: Apr. 24, 2019

(51) Int. Cl.
*G06F 3/12* (2006.01)

(52) U.S. Cl.
CPC .......... *G06F 3/1267* (2013.01); *G06F 3/1204* (2013.01); *G06F 3/1205* (2013.01); *G06F 3/1238* (2013.01); *G06F 3/1285* (2013.01); *G06F 3/1292* (2013.01)

(58) Field of Classification Search
CPC .............. G06F 3/1267; G06F 3/12–3/1297
See application file for complete search history.

(56) References Cited

U.S. PATENT DOCUMENTS

| | | | | |
|---|---|---|---|---|
| 2003/0142345 A1* | 7/2003 | Bunn | ..................... | G06F 3/1204 358/1.15 |
| 2004/0030598 A1* | 2/2004 | Boal | ..................... | G06Q 30/02 705/14.25 |
| 2004/0174561 A1* | 9/2004 | Fukunaga | .......... | H04N 1/32427 358/1.15 |
| 2008/0037062 A1* | 2/2008 | Omino | .................. | G06F 21/305 358/1.15 |
| 2013/0226700 A1* | 8/2013 | Lewis | .................... | G06Q 30/02 705/14.55 |
| 2015/0205879 A1* | 7/2015 | Karasudani | ............. | H04L 67/22 707/737 |
| 2018/0082159 A1* | 3/2018 | Torii | ..................... | G06F 3/1213 |

FOREIGN PATENT DOCUMENTS

JP        2003-347988 A        12/2003

\* cited by examiner

*Primary Examiner* — Nicholas Pachol
(74) *Attorney, Agent, or Firm* — Hawaii Patent Services; Nathaniel K. Fedde; Kenton N. Fedde

(57) ABSTRACT

Provided is an image forming system that accumulates required information and can print the information even if running out battery of a portable terminal. An information selecting part selects browsing information corresponding to a specified condition from information. Browsing information can be printed on an image forming apparatus and is selected from the information, which the user is browsing. This is for browsing if the portable terminal is unusable. An information transmission part transmits browsing information selected by information selecting part to the image forming apparatus. An information accumulation part accumulates the browsing information received from the portable terminal. An image formation part prints the browsing information accumulated by the information accumulation part.

8 Claims, 5 Drawing Sheets

IMAGE FORMING SYSTEM, PORTABLE TERMINAL, AND IMAGE FORMING METHOD THAT STORES OR TRANSMITS BROWSING INFORMATION BASED ON STORAGE COMPACITY OF A STORAGE PART

BACKGROUND

The present disclosure relates to an image forming system, a portable terminal, and an image forming method, especially to the image forming system, the portable terminal, and the image forming method which accumulates information from the portable terminal.

As typical technology, an image forming apparatus, such as an MFP (Multifunctional Peripheral, MFP) which can print information on a document, an image, or the like, which a user specifies by a portable terminal, such as a smart phone, via a network is present. However, when capacity of a battery of the portable terminal reduces and becomes unusable, or the like, naturally, neither selecting nor transmitting the document or the image on the portable terminal is possible. Thus, in such a state, printing cannot be performed on the image forming apparatus.

On the other hand, as typical technology, a portable telephone which can complete backup of the stored information without troubling a user, certainly, is disclosed. In this technology, a mobile communication terminal that stores information determines whether charge is started or not to the battery of the self-apparatus. Then, only when it determines with charge having been started, stored information on the self-apparatus is transmitted to a backup processing unit which can be communicated with the self-apparatus via a communications network. Thereby, a backup processing unit is requested to store the respective information.

SUMMARY

An image forming system of the present disclosure is an image forming system having a portable terminal and an image forming apparatus, wherein the portable terminal includes an information selecting part configured to select browsing information, which is possible to be printed on the image forming apparatus, corresponding to a specified condition from the information which the user is browsing in order to browse when the portable terminal is unusable, and an information transmission part configured to transmit the browsing information selected by the information selecting part to the image forming apparatus; and the image forming apparatus includes an information accumulation part configured to accumulate the browsing information received from the portable terminal, and an image forming part configured to print the browsing information accumulated by the information accumulation part.

A portable terminal of the present disclosure includes an information selecting part configured to select browsing information, which is possible to be printed on an image forming apparatus, corresponding to a specified condition from the information which the user is browsing in order to browse when the portable terminal itself is unusable; and an information transmission part configured to transmit the browsing information by the selected information selecting part to the image forming apparatus.

An image forming method of the present disclosure is an image forming system having a portable terminal and an image forming apparatus, including the steps of: by the portable terminal, selecting browsing information, which is possible to be printed on the image forming apparatus, corresponding to a specified condition from the information which the user is browsing in order to browse when the portable terminal is unusable; by the portable terminal, transmitting the selected browsing information to the image forming apparatus; by the image forming apparatus, accumulating the browsing information received from the portable terminal; and by the image forming apparatus, printing the accumulated browsing information.

DETAILED DESCRIPTION

Embodiment

Figure 1:
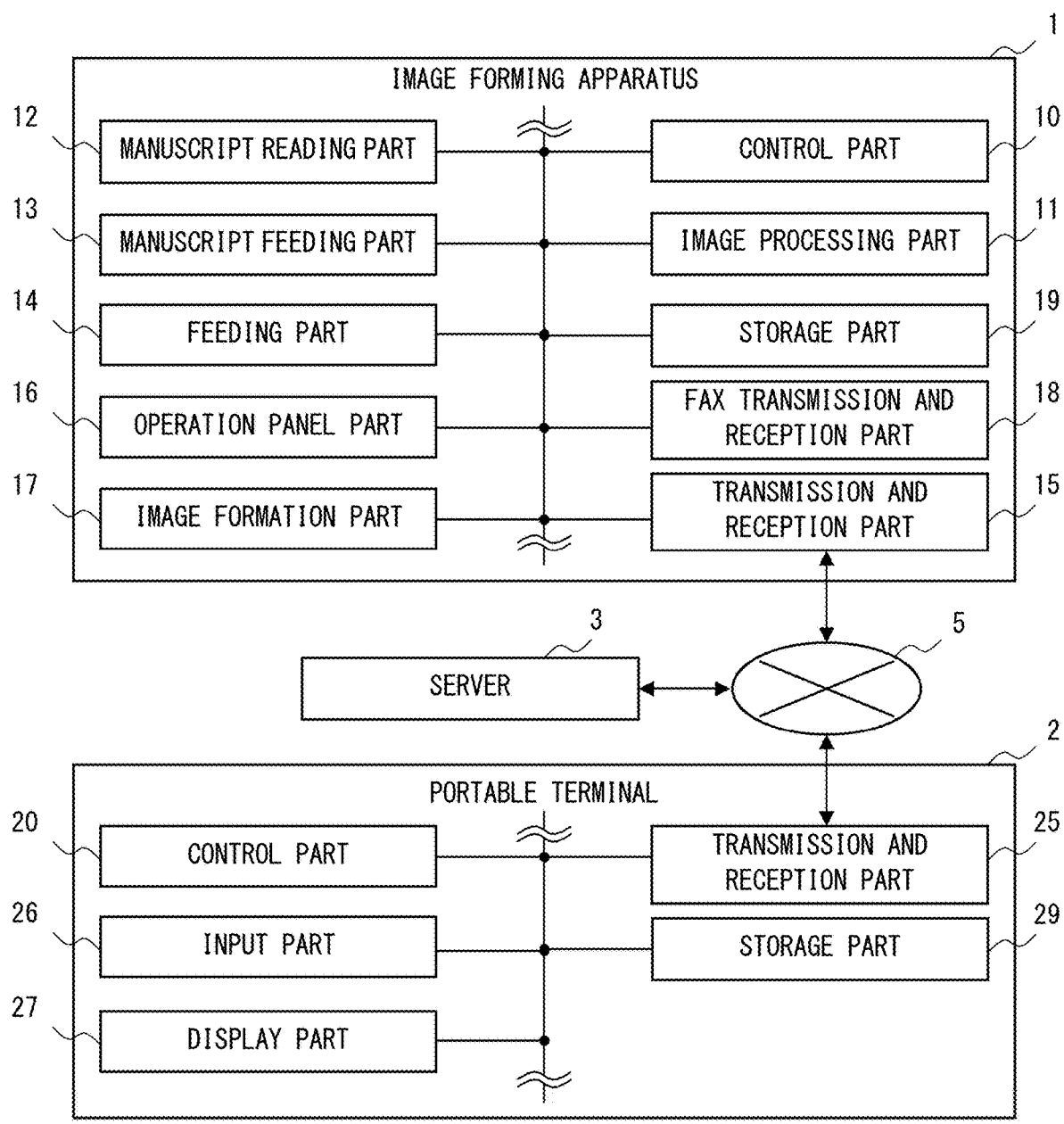
FIG. 1 is a system configuration figure of an image forming system according to an embodiment of the present disclosure.

[System configuration of image forming system X]
Firstly, with reference to FIG. 1, the system configuration of image forming system X according to the embodiment of the present disclosures is explained. Image forming system X is configured that image forming apparatus 1, portable terminal 2, and server 3 are connected with network 5.

Figure 2:
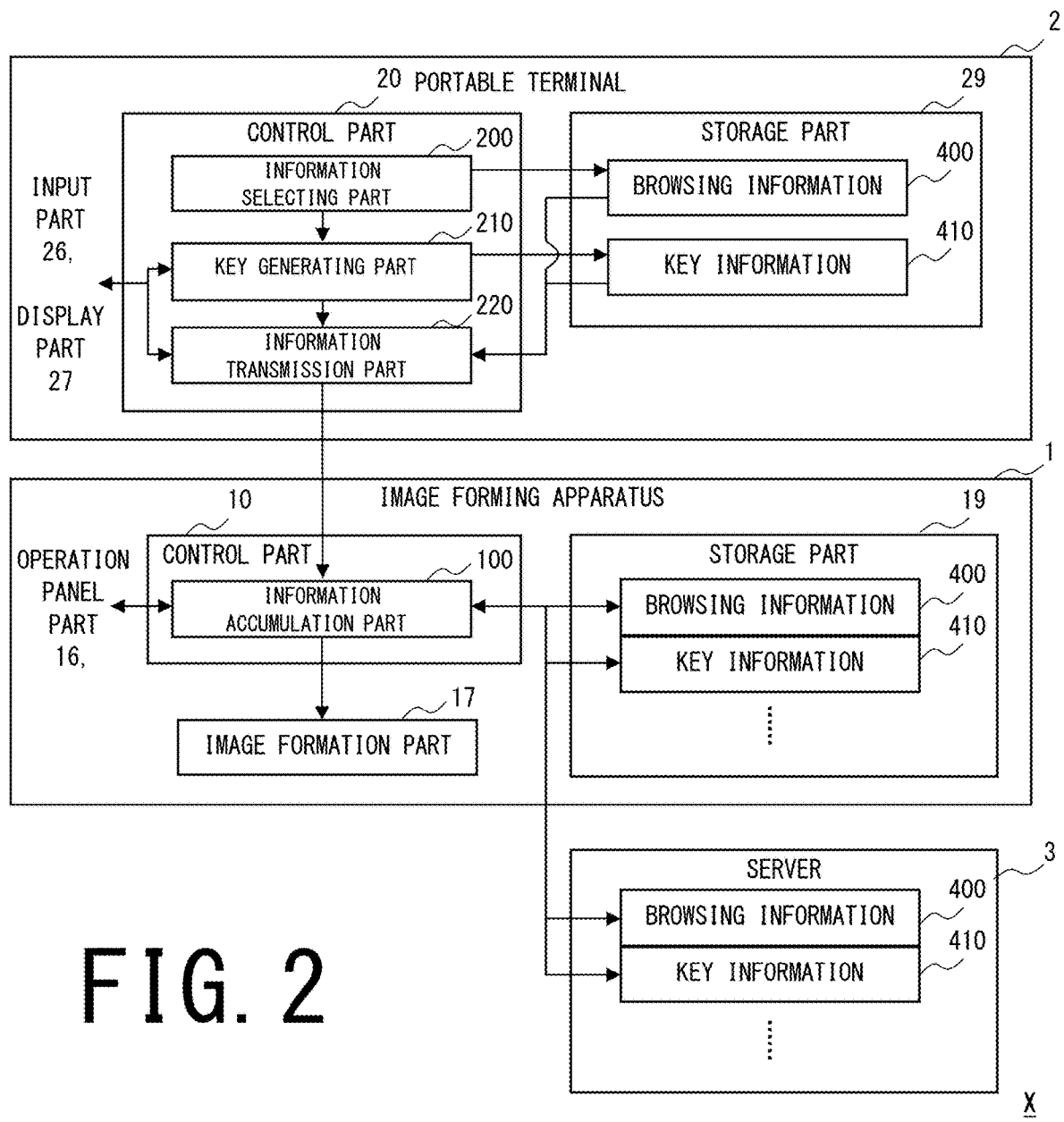
FIG. 2 is a block diagram showing a functional configuration of an image forming system as shown in FIG. 1.

Image forming apparatus 1 is an image forming apparatus, such as an MFP and a printer, or the like. At the present embodiment, image forming apparatus 1 can print browsing information 400 (FIG. 2). Portable terminal 2 is a portable terminal, such as a smart phone, PC (Personal Computer), PDA (Personal Data Assistant), a cellular phone, or the like. In the present embodiment, portable terminal 2 can generate browsing information 400, and it can transmit browsing information 400 to image forming apparatus 1. Server 3 is a server (service) on the so-called "cloud," a server on intranet, NAS (Network Attached Storage), or the like, and it can accumulate file(s). Server 3 may be provided by an administrator of image forming system X, or the like. Network 5 is IP networks, such as wired LAN (Ethernet), wireless LAN (Wi-Fi), the Internet, a mobile phone network, other type of WAN (Wide Area Network), and the like.

Here, a control configuration of image forming apparatus 1 according to the embodiment of the present disclosures is explained. Image forming apparatus 1 includes image processing part 11, manuscript reading part 12, manuscript feeding part 13, feeding part 14, transmission and reception part 15, operation panel part 16, image formation part 17, FAX transmission and reception part 18, and storage part 19, or the like. Each part is connected to control part 10, and control part 10 operation-controls them.

Control part 10 is an information processing part, such as GPP (General Purpose Processor), CPU (Central Processing Unit, central processing unit), MPU (Micro Processing Unit), DSP (Digital Signal Processor), GPU (Graphics ProcessingUnit), ASIC (Application Specific Integrated Circuit, processor for particular applications), or the like. Control part 10 reads the control program stored in ROM or HDD of storage part 19, expands this control program to RAM, and executing it, and is operated as each part of the functional block as described later. The control program includes various application software (hereinafter, it is only called as an "application"). The application includes the application for exclusive use for image forming apparatuses 1 (henceforth "a dedicated application") which makes browsing information 400 (FIG. 2) by image forming system X in the present embodiment accumulate and print. In addition, control part 10 controls a whole device corresponding to specified instructions information inputted on portable terminal 2 or operation panel part 16.

Image processing parts 11 are control arithmetic part, such as DSP (Digital Signal Processor), GPU (Graphics Processing Unit), a processor by using ASIC, or the like. Image processing part 11 performs specified image processing for image data. The image processing is, for example, enlarging/reducing, density adjustment, gradation adjustment, an image improvement, or the like. Image processing part 11 stores image data, which is read by manuscript reading part 12, in storage part 19. In this case, image processing part 11 can also convert the image data into a file as like electronic document data, such as PDF (Portable Document Format), or the like. The image data can also be transmitted to portable terminal 2 or server 3.

Manuscript reading part 12 is a part to read (scan) a set manuscript. Manuscript reading part 12 is arranged on the upper part of the body part of image forming apparatus 1. Manuscript reading part 12 is provided with a scanner, platen glass, and a manuscript reading slit. In reading the manuscript placed on platen glass, manuscript reading part 12 moves the scanner to the position which faces to platen glass. Then, manuscript reading part 12 reads with scanning the manuscript placed on platen glass and acquires image data. Manuscript reading part 12 outputs the acquired image data to control part 10.

Also, in reading the manuscript fed from manuscript feeding part 13, manuscript reading part 12 moves the scanner to the position which faces to the manuscript reading slit. Then, manuscript reading part 12 reads the manuscript via the manuscript reading slit synchronizing with the conveying operation of the manuscript by manuscript feeding part 13. Thereby, image data is acquired. Manuscript reading part 12 outputs the acquired image data to control part 10.

Manuscript feeding part 13 is a part to convey the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 sequentially-feeds out manuscript placed on the manuscript mounting part one at a time by the manuscript transport mechanism and feeds to manuscript reading part 12.

Feeding part 14 is a mechanism which feeds out one sheet of recording paper at a time toward to image formation part 17. Feeding part 14 is provided in the body part.

Transmission and reception part 15 is a unit connected to network 5, or the like. Transmission and reception part 15 may include, for example, a LAN board, a wireless transmitter receiver, or the like. By transmission and reception part 15, transmitting and receiving data between portable terminal 2 and server 3 is available. In addition, transmission and reception part 15 may also include circuits, such as USB (Universal Serial Bus), or the like. It may be connected with portable terminal by the USB. Furthermore, it may be configured that transmission and reception part 15 transmits and receives data by the line for data communications and transmits and receives an audio signal by a voice call line.

Operation panel parts 16 are input parts, such as a button, a touch panel, or the like, and a display part, such as LCD (Liquid Crystal Display), OEL (organic electro-luminescence, organic light-emitting diode, OLED) display, or the like. Also, operation panel part 16 is arranged on the front-side of image forming apparatus 1. The display part of operation panel part 16 can display browsing information 400 (FIG. 2). The button of the input part of operation panel part 16 is a button, or the like, which are a numeric keypad, a start, a cancel, switching of operational mode, instructions for executing of a job, and the like. The operational mode includes modes, such as a copy, a FAX transmission, a scanner, a network scanner, or the like. Also, job includes the types, such as printing, transmitting, storing, recording, or the like, for the selected document. The input part of operation panel part 16 acquires instructions of the various jobs of image forming apparatus 1 by a user. Also, the input part of operation panel part 16 can acquire key information 410 (FIG. 2). In addition, the input part can also input and change each user's information by user instructions.

Image formation part 17 is a part to perform image formation from the data, which is stored in storage part 19, is read by manuscript reading part 12, or is acquired from portable terminal 2 to a recording paper by output instruction by a user. The image forming part 17 includes a photosensitive drum, an exposure unit, a developing unit, a transfer unit, a fixing unit, and the like. Image formation part 17 records a toner image on a recording paper by executing the image formation process which includes charging, exposure, development, transfer, and fixing.

FAX transmission and reception part 18 is a unit which transmits and receives a facsimile. FAX transmission and reception part 18 can perform facsimile reception from other FAX equipment by a voice line, stores it in storage part 19, and perform image formation by image formation part 17. Also, FAX transmission and reception part 18 can convert the data of network FAX into image data and can perform facsimile transmission by a voice line to another FAX equipment. The data of network FAX is the data transmitted from the manuscript read by manuscript reading part 12, the terminal 2, or the like.

Storage part 19 is the memory unit which is used non-transitory recording media, which is, for example, semiconductor memory, such as ROM (Read Only Memory) and RAM (Random Access Memory), or the like, HDD (Hard Disk Drive), or the like. A control program, data, or the like, for operation-controlling image forming apparatus 1 is stored in ROM and HDD of storage part 19.

Then, the configuration of portable terminal 2 according to the embodiment of the present disclosures is explained. As for portable terminal 2, transmission and reception part 25, input part 26, display part 27, and the storage part 29, or the like, are connected to control part 20. Each part of portable terminal 2 is operation-controlled by control part 20.

Control part 20 is configured as CPU, MPU, DSP, GPU, ASIC, or the like, which provides control calculation capacity. Control part 20 executes each program stored in storage part 29 by using hardware resources. In detail, control part 20 executes a control program and realizes a various function.

Transmission and reception part 25 is a circuit, or the like, which transmit and receive data with image forming apparatus 1. Transmission and reception part 25 is provided with a LAN board, a wireless transmitter receiver, a USB (Universal Serial Bus) interface, or the like.

Input part 26 is a touch panel, a physical button, or the like, for performing operation by the user. Display part 27 is LCD, OEL display, or the like. Input part 26 and display part 27 are used in order to input various instructions when executing a common application and a dedicated application to generate browsing information 400 (FIG. 2).

Storage part 29 is the memory unit which is used non-transitory recording media, such as RAM, a flash memory disk such as SSD, or the like, HDD, a magnetic tape unit, an optical disk unit, or the like. Storage part 29 stores OS (Operating System) for functioning portable terminal 2 as a computer, a device driver (henceforth "driver") of image forming apparatus 1, various applications, other programs, data, or the like. Further, a dedicated application for portable terminal 2 to transmit browsing information 400 (FIG. 2) to image forming apparatus 1 is also installed in storage part 29. This dedicated application can be downloaded from a server provided by the provider of image forming system X, a server for applications, and image forming apparatus 1, or the like, and it can be installed. These various programs as the control programs of portable terminal 2 are executed by control part 20. Also, storage part 29 may store apparatus specific information such as a serial number, attribute (user layer) information such as whether the user belongs to the department or the office, account settings, or the like. These programs and data can be read and written by control part 20.

In addition, in image forming apparatus 1, control part 10 and image processing part 11 may be integrally formed as like CPU with built-in GPU, a chip-on module package, SOC (System On a Chip), or the like. Also, control part 10 and image processing part 11 may incorporate the recording medium. Also, in portable terminal 2, control part 20 may incorporate the recording medium.

[Functional Configuration of Image Forming System X]

Here, with reference to FIG. 2, the functional configuration of image forming apparatus X according to the embodiment of the present disclosures is explained. Control part 10 of image forming apparatus 1 is provided with information accumulation part 100 (information accumulation part). Storage part 19 stores browsing information 400 and key information 410. Control part 20 of portable terminal 2 is provided with information selecting part 200 (information selecting part), key generating part 210 (key generating part), and information transmission part 220 (information transmission part). Storage part 29 stores temporarily browsing information 400 and key information 410. Server 3 stores browsing information 400 and key information 410.

Information accumulation part 100 accumulates browsing information 400 and key information 410, which are received from portable terminal 2, to storage part 19 or server 3. Here, information accumulation part 100 stores browsing information 400 in a storage part when the storage capacity of storage part 19 is greater than or equal to a specific value. Information accumulation part 100 transmits browsing information 400 to external server 3 when the storage capacity of storage part 19 is less than a specific value and makes server 3 store it.

In the present embodiment, image formation part 17 functions as an image forming part which prints browsing information 400 accumulated in storage part 19 or server 3 by information accumulation part 100.

Information selecting part 200 selects browsing information 400 corresponding to a specified condition from information, which the user is browsing. Information selecting part 200 stores selected browsing information 400 in storage part 29, temporarily. What kind of browsing information 400 is outputted is selected by the user, or it is automatically-selected by using the specified condition. The selection by the user is possible to perform on a setting screen of the dedicated application in portable terminal 2.

Key generating part 210 generates key information 410 per user and/or per portable terminal 2. For example, key generating part 210 indicates to a user whether or not generating key information 410 when remaining battery amount is lower than a specific amount. In addition, by the user instruction, key generating part 210 can generate key information 410 and can also show it to the user.

Information transmission part 220 transmits browsing information 400 and key information 410, which are selected by information selecting part 200, to image forming apparatus 1. The transmission is performed via network 5.

Browsing information 400 is data for printing in which a paper output is possible in image forming apparatus 1, and it is used in order to browse when portable terminal 2 is unusable. Browsing information 400 is, for example, image data or electronic document data of a screen shot that is selected on various applications. In addition, browsing information 400 may be important information that, for example, image data or electronic document data by which the screen shot is performed when the user searches by using specific application(s) among the various applications. In detail, browsing information 400 may be any one or the arbitrary combination of the information of navigation, an electronic ticket, a coupon, an account code, a confirmation screen, and information selected by user instruction. Among these, the information of navigation may be image data or electronic document data that shows a guidance result of car navigation, or the like. The format of the image data may be bitmap, PNG, jpg, or the like. Electronic document data may be an archive of various kinds of web browsing screens, such as HTML (Hyper Text Markup Language), PDF, or the like. Also, browsing information 400 may include various files, such as a file of a word processor or a spreadsheet, and a text file, or the like, as electronic document data. Furthermore, browsing information 400 may include information such as a name of acquired portable terminal 2, environment such as a type of application, a version, OS, or the like, acquisition time, position information at the time of being acquired portable terminal 2, or the like.

Key information 410 is information of a secret key, or the like, for accessing, browsing, and printing browsing information 400, which is sent to image forming apparatus 1. For example, key information 410 may be key codes, such as the PIN code, a keyword, and an authentication text character string, or the like.

In addition, a storage area is set to storage part 19 for each user and/or portable terminal 2 by using a database, or the like. According to the present embodiment, key information 410 is generated for each of the storage area.

Here, control part 10 of image forming apparatus 1 executes a control program including the dedicated application stored in storage part 19 and is functioned as information accumulation part 100. Control part 20 of portable terminal executes a control program including the dedicated application stored in storage part 29 and is functioned as information selecting part 200, key generating part 210, and information transmission part 220. Also, above-mentioned each part of image forming apparatus 1 and portable terminal 2 serve as hardware resources which execute the image forming method in the present disclosure. In addition, the above-mentioned part or arbitrary combination of functional configuration may be configured by using an IC, a programmable logic, a FPGA (Field-Programmable Gate Array), or the like, as hardware.

Figure 3:
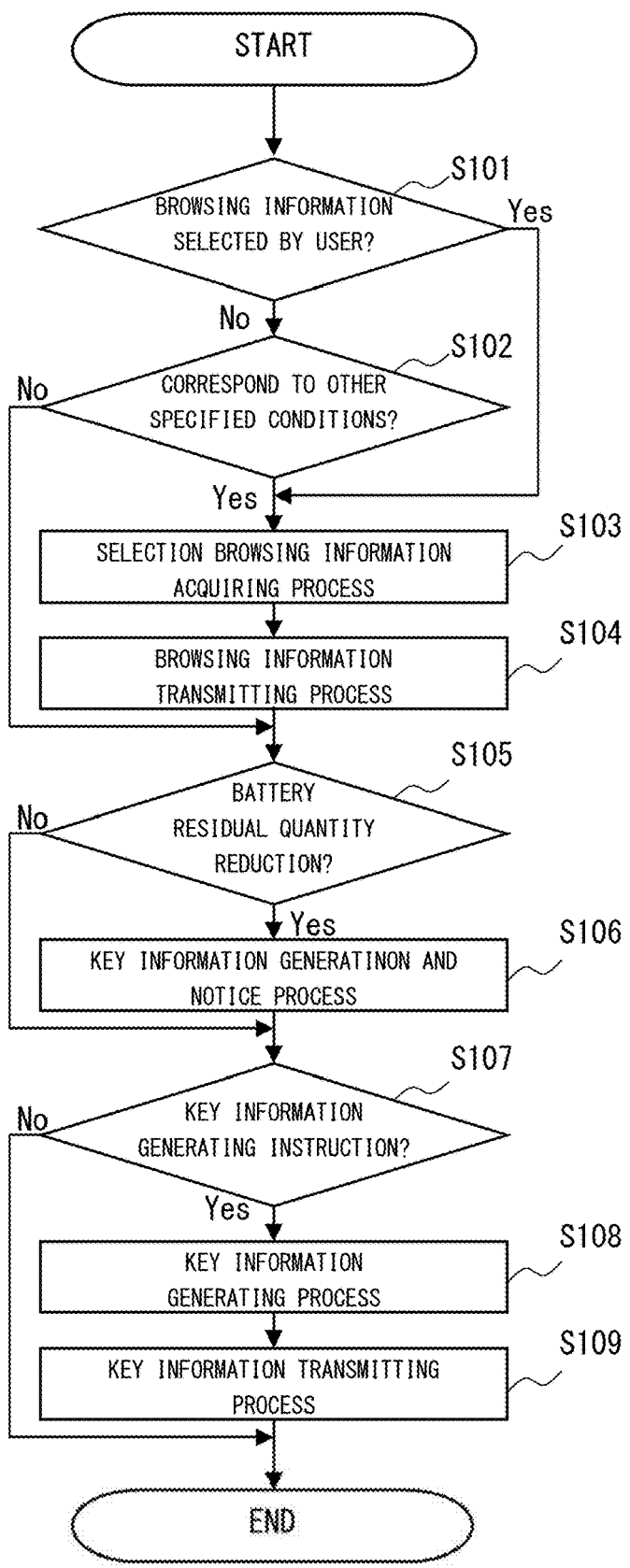
FIG. 3 is a flow chart processing in a terminal of an information storage printing process according to an embodiment of the present disclosure.
Figure 4:
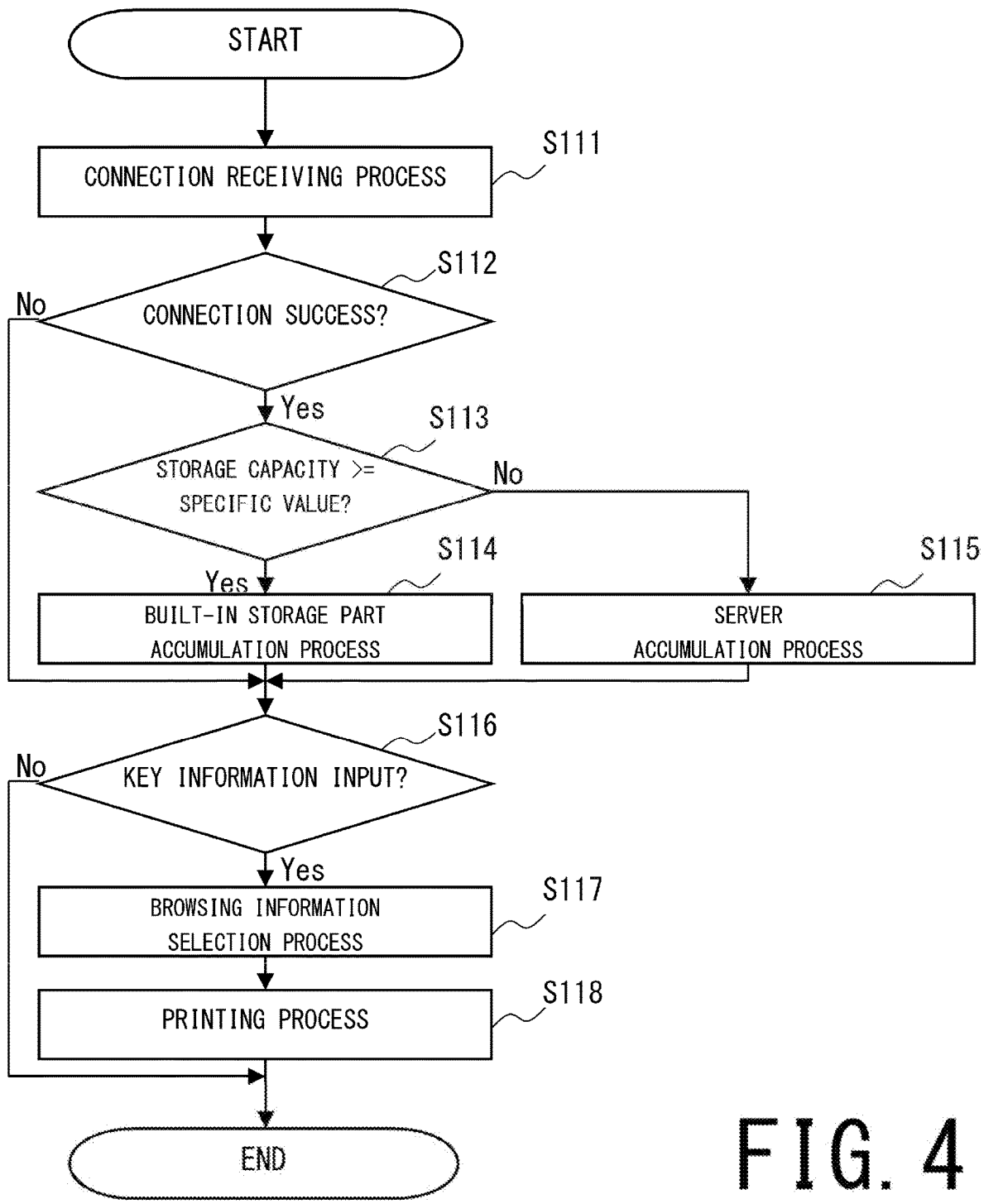
FIG. 4 is a flow chart processing in an image forming apparatus of the information storage printing process according to the embodiment of the present disclosure.
Figure 5:
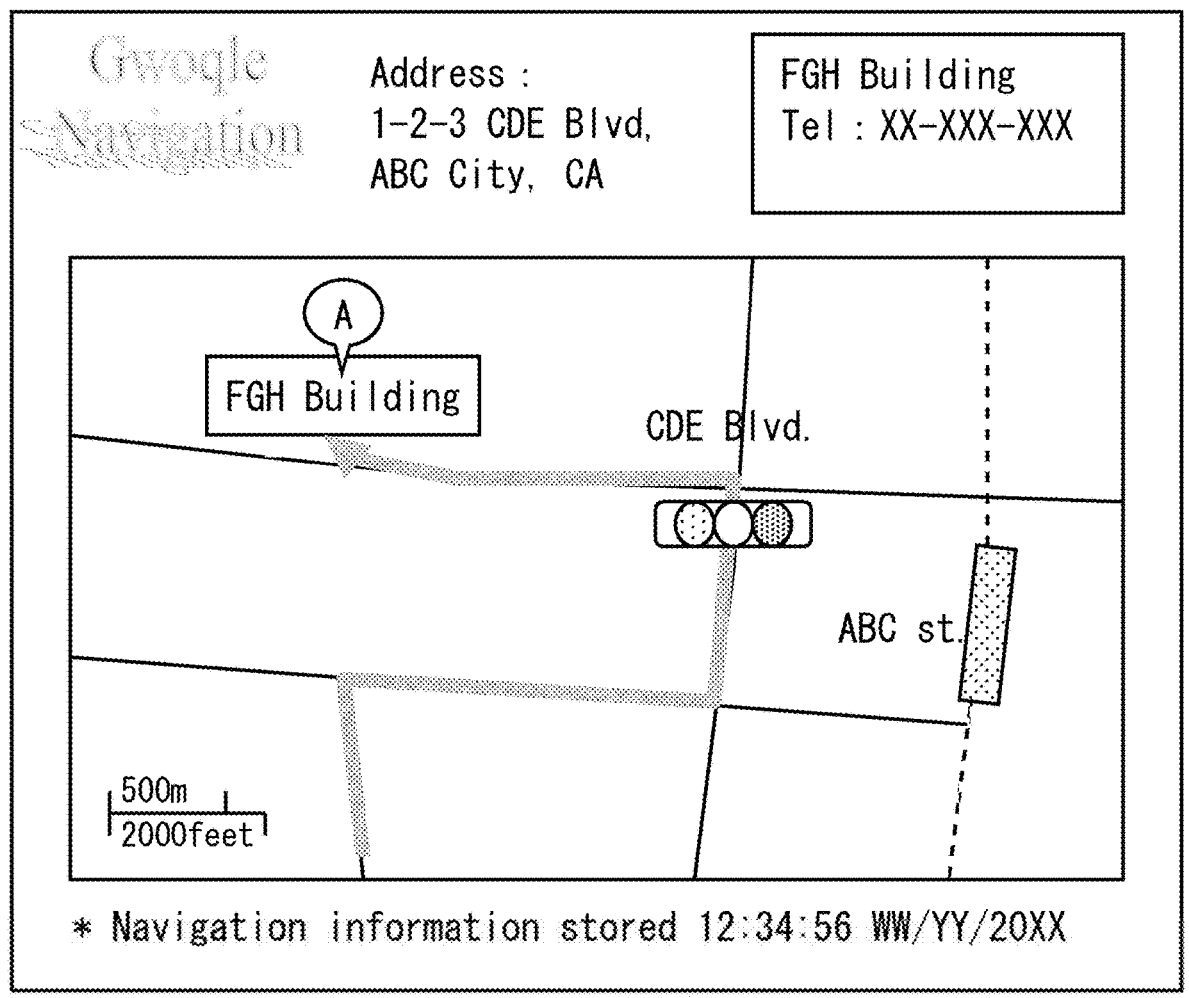
FIG. 5 is a conceptual diagram of a screen shot outputted in the information storage printing process as shown in FIG. 3 and FIG. 4.

[Information storage printing process by image forming system X] Then, with reference to FIG. 3-FIG. 5, the information storage printing process by image forming system X according to the embodiment of the present disclosures is explained.

[Process by Portable Terminal 2]

First of all, a process by portable terminal 2 of the information storage printing process is explained. Here, in the present embodiment, when the user installs the dedicated application in portable terminal 2, for example, information selecting part 200 executes in the background as like a device driver or a service (daemon). Further, in the present process, browsing information 400 in which a paper output with an image forming apparatus is possible is selected from the information which the user is browsing by various applications as corresponded to a specified condition. It is for browsing when a portable terminal is unusable. Then, it transmits selected browsing information 400 to an image forming apparatus and makes store. For the process by portable terminal 2 in the information storage printing process in the present embodiment, control part 20 collaborates with each part and executes the control program stored in storage part 29 by using hardware resources. In the following, with reference to the flow chart of FIG. 3, the details of this process are explained for each step.

(Step S101)

Firstly, information selecting part 200 determines whether browsing information 400 is selected by user instruction or not. Information selecting part 200 selects browsing information 400 in which a paper output is possible with image forming apparatus 1 corresponding to a specified condition in order to browse when portable terminal 2 is unusable. In this process, information selecting part 200 determines as a specified condition both in a case that image data coupled to a screen shot is selected as browsing information 400 and a case that a user explicitly-points out and selects browsing information 400.

In detail, the user can instruct a screen capture function, that is, a screen shot, by a general web browser, other applications, or the like. Instructions of the screen shot may be used even instructions by operation of button, a touch, or the like, in input part 26, which is standardly set in OS, or instructions by depression of a button, a widget, a gadget (only henceforth "dedicated button, or the like"), or the like, drawn by the dedicated application on the screen. In this case, information selecting part 200 may detect the instruction of the screen shot themselves from input part 26 or may detect that the image data of the screen shot is stored in storage part 29. If there is the detection, information selecting part 200 determines that browsing information 400 is selected by the user instruction, that is, Yes.

On the other hand, information selecting part 200 can select executing application and can also instruct a screen shot by using a screen, dedicated buttons, or the like, on the dedicated application. In this case, the user can point out to various files, explicitly, and can also select browsing information 400. Further, converting a whole page of the selected application into electronic document data, or the like, the user can select this as browsing information 400. Also, in these cases, information selecting part 200 determines to Yes.

Information selecting part 200 determines to No if other.

In Yes, information selecting part 200 advances a process to Step S103. In No, information selecting part 200 advances a process to Step S102.

(Step S102)

If the user has not selected browsing information 400, information selecting part 200 determines whether it corresponds to other specified conditions or not. In this process, information selecting part 200 autonomously-determines whether it corresponds to other specified conditions according to the type and situation of various applications while the user is using portable terminal 2. In the present embodiment, information selecting part 200 determines as corresponding to the specified condition to be accumulated as browsing information 400 for navigation, an electronic ticket, a coupon, an account code, a confirmation screen, or the like, as various applications.

In detail, for example, when a route from a house, an office, or the like, to a specific place, or the like, is searched and preserved in the application of navigation, since the information is presumed to be important for a user, information selecting part 200 determines as it corresponds to the specified condition. As this example, a case where the user searches the route from his present location to the destination, or the like, in the application of Google® map by using a navigation function and preserves the result, or the like, is correspond to. In such a case, information selecting part 200 determines to Yes as corresponded to the specified condition. That is, since the application of navigation has intense consumption of a battery, generally, and the user's movement is expected, this corresponds to the specified condition to be accumulated as browsing information 400.

Also, if an electronic ticket, a coupon, an account code, a confirmation screen, or the like, is displayed on display part 27, information selecting part 200 corresponds to the specified condition, and it determines to Yes. Usually, since a user indicates a screen to display part 27 in portable terminal 2 at a movement destination, these cases correspond to the specified condition to be accumulated as browsing information 400.

If the case is other than the specified conditions as mentioned above, information selecting part 200 determines to No.

In Yes, information selecting part 200 advances a process to Step S103. In No, information selecting part 200 advances a process to Step S105.

(Step S103)

Here, information selecting part 200 performs a selection browsing information acquiring process. If there is browsing information 400 selected by the user, information selecting part 200 stores it in storage part 29. On the other hand, if it determines to be corresponded to the other specified conditions, information selecting part 200 selects the preserved search results of navigation, the image data of the various applications, which is displayed on and display part 27 of portable terminal 2, or the like, as browsing information 400 and stores it in storage part 29.

(Step S104)

Then, information transmission part 220 performs a browsing information transmitting process. Information transmission part 220 transmits browsing information 400, which is selected by information selecting part 200 and is stored in storage part 19, to image forming apparatus 1. This transmission may be performed immediately after storing browsing information 400, or may be performed to specific timing. In addition, information transmission part 220 can perform this transmission with various protocols. These various protocols, for example TCP/IP (Transmission Control Protocol/Internet Protocol), an LPR protocol, IPR (Internet Printing Protocol), FTP (File Transfer Protocol), an E-mail, a messenger, or the like. These various protocols include the dedicated protocol for a pull print, the dedicated protocol for the dedicated application for image forming apparatus 1 and portable terminal 2, or the like. Further, information transmission part 220 may transmit, in view of it encrypts browsing information 400.

(Step S105)

Here, key generating part 210 determines about whether remaining amount of battery is reduced or not. Key generating part 210 acquires battery residual quantity, and if this is lower than a specific amount, it determines to Yes. Key generating part 210 determines to No if other (that is a case when the battery residual quantity is not reducing). In Yes, key generating part 210 advances a process to Step S106. In No, key generating part 210 advances a process to Step S107.

(Step S106)

If the remaining quantity of the battery reduces, key generating part 210 performs a key information generation and notice process. Key generating part 210 notifies to the user whether it needs the generation of key information 410 or not. For example, key generating part 210 performs this notice by displaying a dialog box on display part 27 as a pop-up or by notifying by using a messenger, or the like. Key generating part 210 acquires instructions of generating key information 410 by this notice.

(Step S107)

Here, key generating part 210 determines whether there is an instruction of generation key information 410 by the user or not. Key generating part 210 determines to Yes if the generation of key information 410 is instructed in the above-mentioned dialog box, or the like. In addition, key generating part 210 determines to Yes also if the generation of key information 410 is instructed by a screen, a dedicated button, or the like, on the dedicated application. That is, it is also possible to instruct the generation of key information 410 without reference to the residual quantity of the battery. Otherwise, key generating part 210 determines to No. In Yes, key generating part 210 advances a process to Step S108. In No, key generating part 210 ends the process of an information storage printing process on portable terminal 2.

(Step S108)

If there is the instruction of making of key information 410, key generating part 210 performs a key information generating process. Key generating part 210 generates key information 410 by using a random number, or the like, and displays it on display part 27 to show the user or shows it by the messenger, or the like. Here, in the present embodiment, key information 410 is generated or updated for each user and/or for each portable terminal 2.

(Step S109)

Then, information transmission part 220 performs a key information transmitting process. Information transmission part 220 transmits generated key information 410 via network 5. This transmission is performed by using the various protocols, which are similar to above-mentioned transmission of browsing information 400. In this case, it may be encrypted and transmitted. Image forming apparatus 1, which has been received key information 410, is associated the user and/or the portable terminal 2 with it and stores it in the respective storage area. The process by image forming apparatus 1 is explained as follows. As above-mentioned, the process by portable terminal 2 in the information storage printing process according to the embodiment of the present disclosures is ended.

[Process by Image Forming Apparatus 1]

Then, the process by image forming apparatus 1 in the information storage printing process of the present embodiment is explained. In this process, browsing information 400 received from portable terminal 2 is accumulated. In this accumulation, "storage mode" stored in built in storage part 19 or "cloud mode" stored in external server 3 is selected and executed. In addition, when key information 410 is inputted, accumulated browsing information 400 is printed. In the information storage printing process of the present embodiment, control part 10 in image forming apparatus 1 collaborates with each part and executes the control program stored in storage part 19 by using hardware resources. In the following, with reference to the flow chart of FIG. 4, the details of this process are explained for each step.

(Step S111)

Firstly, information accumulation part 100 performs a connection receiving process. Information accumulation part 100 is connected with portable terminal 2 with above-mentioned various protocols. Thereby, when connection is successful, above-mentioned browsing information 400 or key information 410 is received, and they are stored in storage part 19, temporarily.

(Step S112)

Then, information accumulation part 100 determines whether connection is successful or not. Information accumulation part 100 determines to Yes if it can connect with portable terminal 2. Information accumulation part 100 determines to No if it cannot connect with portable terminal 2. In Yes, information accumulation part 100 advances a process to Step S113. In No, information accumulation part 100 advances a process to Step S116.

(Step S113)

If connection with portable terminal 2 is successful, information accumulation part 100 determines whether storage capacity is greater than or equal to a specific value or not. Information accumulation part 100 determines to Yes if the storage capacity of storage part 19 is greater than or equal to the specific value. This specific value is computable by a storage capacity of HDD, or the like, in storage part 19, settings of the storage area assigned to the user and/or portable terminal 2, or the like, in image forming apparatus 1. Information accumulation part 100 determines to No if the storage capacity of storage part 19, or the like, is less than the specific value. In Yes, information accumulation part 100 advances a process to Step S114. In No, information accumulation part 100 advances a process to Step S115.

(Step S114)

If the storage capacity is greater than or equal to the specific value, information accumulation part 100 performs a built-in storage part accumulation process. As a "storage mode", information accumulation part 100 stores browsing information 400 and key information 410 at the storage area assigned to the user and/or portable terminal 2 in built-in storage part 19. Then, information accumulation part 100 advances a process to Step S116.

(Step S115)

If the storage capacity is less than the specific value, information accumulation part 100 performs a server accumulation process. Information accumulation part 100 stores browsing information 400 and key information 410 in server 3 as "cloud mode." In this case, information accumulation part 100 logs in server 3 if required, and it assigns the storage area to the user and/or portable terminal 2 in a storage part of server 3. The information for login to server 3 may be set to image forming apparatus 1 by the administrator of image forming system X, the user of portable terminal 2, or the like.

Here, after a specific period of several days to several months has elapsed, these browsing information 400 and key information 410 may be deleted regardless of being stored in storage part 19 or in server 3. Thereby, it is possible to raise security.

(Step S116)

Here, information accumulation part 100 determines whether key information 410 is inputted by the user or not. In the case of portable terminal 2 having become unusable at battery capacity reduction, or the like, the user can log in to image forming apparatus 1, executes dedicated application for image forming apparatus 1, and input key information 410 on operation panel part 16. If this key information 410 is inputted, information accumulation part 100 determines to Yes. Otherwise, information accumulation part 100 determines to No. In Yes, information accumulation part 100 advances a process to Step S117. In No, information accumulation part 100 ends the process by image forming apparatus 1 in the information storage printing process.

(Step S117)

If key information 410 is inputted, information accumulation part 100 performs a browsing information selection process. Information accumulation part 100 acquires a list of browsing information 400 associated with the user and/or portable terminal 2 from storage part 19 and/or server 3. Then, information accumulation part 100 displays the preview image of browsing information 400, acquisition time, position information, the name of portable terminal 2, or the like, on the display part of operation panel part 16. Thereby, a user can browse browsing information 400 and can select to print in it. Screen example 500 of FIG. 5 is an example of browsing information 400, which is the search results of the navigation and is shown to the user.

(Step S118)

Then, information accumulation part 100 and image formation part 17 perform a printing process. When the user selects browsing information 400 on operation panel part 16 and instructs printing, information accumulation part 100 transmits this browsing information 400 to image formation part 17 in order to make it print. Thereby, even when the terminal 2 becomes unusable due to battery exhaustion or the like, the user can watch browsing information 400 at hand as printed matter. By the above-mentioned, the process by image forming apparatus 1 in the information storage printing process according to the embodiment of the present disclosures is ended.

The following effects can be obtained as configured as described above. In recent years, portable terminals such as smartphones, or the like, have become widespread, various applications are developed to make life convenient. In the portable terminal, the built-in battery is generally used. When the capacity of this battery drops, obviously, the portable terminal does not operate at all. Then, if all important information is in the smart phone, it may be troubled because the information cannot be obtained. However, in a typical technology of backup, a telephone directory and contents are only backed up, simply, and thus information that hopes to print and browse in the case of being unusable the portable terminal cannot be preserved.

On the other hand, image forming system X according to the embodiment of the present disclosures includes portable terminal 2 and image forming apparatus 1. Portable terminal is provided with information selecting part 200 and information transmission part 220. Information selecting part 200 selects browsing information 400 in which a paper output is possible on image forming apparatus 1 from the information which the user is browsing corresponding to a specified condition in order to browse when the portable terminal 2 is unusable. Information transmission part 200 transmits browsing information 400 selected by the information selecting part 200 to the image forming apparatus 1. Image forming apparatus 1 is provided with information accumulation part 100 and image formation part 17. Information accumulation part 100 accumulates browsing information 400 received from portable terminal 2. Image formation part 17 prints browsing information 400 accumulated by information accumulation part 100.

As configured in this way, in image forming system X in the present embodiment, when battery residual quantity decreases, browsing information 400 is transmitted to image forming apparatus 1 in order that required information can be accessed even if the battery runs out. Thereby, if a user hopes to carry browsing information 400 with a paper medium, it can be printed, easily. Especially, it becomes possible to accumulate and print browsing information 400 to browse in case that portable terminal 2 is unusable.

Also, image forming system X according to the embodiment of the present disclosures is further provided with key generating part 210 which generates key information 410 per user and/or per portable terminal 2. When key information 410 is acquired, browsing information 400 is printed by image formation part 17. As configured in this way, when there is no key information 410, printing browsing information 400 cannot be performed. Therefore, security can be raised.

Also, in image forming apparatus 1 according to the embodiment of the present disclosures, browsing information 400 is a screen shot image data or electronic document data. Information selecting part 200 selects the screen shot image data or the electronic document data as browsing information 400 when the user performs a search by a specific application. As configured in this way, the image data or electronic document data at the time of a screen shot can be easily-selected as browsing information 400.

Also, in image forming apparatus 1 according to the embodiment of the present disclosures, browsing information 400 corresponding to the specified condition is any one or arbitrary combination of information of navigation, an electronic ticket, a coupon, an account code, a confirmation screen, and information selected by user instruction. As configured in this way, transmitting browsing information 400 includes the search results searched by navigation, or the like, the electronic ticket, a coupon, an account code, a confirmation screen, or the like, which needs to be presented on a place to go, to image forming apparatus 1. Therefore, even in the case where it is necessary to go out with the remaining battery level low, it can print from accumulated browsing information 400. Therefore, without carrying out an operation to research the required information, which consumes further battery, browsing information 400 can be carried as printed matter. In addition, the time and effort of preparing a mobile battery or preparing another portable terminal becomes not-needed. Also, user selects browsing information 400, arbitrarily, and he or she can print as necessary.

Also, image forming apparatus 1 according to the embodiment of the present disclosures, information accumulation part 100 stores browsing information 400 in storage part 19 when a storage capacity of built-in storage part 19 is greater than or equal to a specific value, and it transmits the browsing information 400 to external server 3 to be stored when the storage capacity is less than the specific value. As configured in this way, even if there are little storage capacities of built-in storage part 19, it transmits to server 3 and can store browsing information 400. Also, because browsing information 400 is stored in server 3 via image forming apparatus 1, which is actually-printed, browsing information 400 can be browsed and be selected on this image forming apparatus 1, easily. In this case, a login for server 3, or the like, is performed by image forming apparatus 1, the user himself/herself becomes unnecessary to carry out to login of so-called cloud service, or the like.

Other Embodiments

In addition, an example to which the specified condition is being fixed is explained in the above-mentioned embodiment. However, an application, a type of file, timing, or the like, which is for selecting browsing information 400 may be set up from a screen of a dedicated application, or the like. Further, the specified condition itself can be learned by A.I. (Artificial Intelligence), such as a neural network(s), or the like. In this case, it is possible to presume important information from user's personal information, use application(s), traveling route, a type of data to print, or the like. As configured in this way, more suitable browsing information 400 can be selected.

In addition, in the above-mentioned embodiment of the present disclosure, an example that previews browsing information 400 on image forming apparatus 1 is explained. However, browsing information 400 is stored also in portable terminal 2, and browsing by the dedicated application, or the like, is also possible. Furthermore, to check transmitting history may be performed. As configured in this way, in the case of the capacity of the battery having been recovered, or the like, even if it does not operate image forming apparatus 1, checking of browsing information 400 can be performed on portable terminal 2, easily. In addition, to print browsing information 400, to delete, or to instruct may also be performed by watching the history from the screen of the dedicated application on portable terminal 2.

Furthermore, in the above-mentioned embodiment, an example that transmits browsing information 400 from image forming apparatus 1 to server 3 is described. However, it may be configured that browsing information 400 is transmitted from portable terminal 2. Even in this case, key information 410 may be stored in image forming apparatus 1. As configured in this way, the time and effort of transmitting from image forming apparatus 1 to server 3 can be suppressed. In addition, as compared with simply-backing up a screen shot to the cloud service, browsing information 400 can be selected and browsed on image forming apparatus 1, easily.

By the above-mentioned embodiment, an example that key information 410 is assigned per user unit and/or per portable terminals 2 for each storage area. However, key generating part 210 may assign key information 410 for each browsing information 400. Further, the user sets up a password, or the like, as key information 410. On the contrary, if a user can log in to image forming apparatus 1, it is also possible to be configured so that key information 410 may not be set up. That is, a login ID and a password may be used as key information 410. As configured in this way, browsing information 400 becomes manageable, flexibly, and security is raised.

Also, the present disclosure is applicable to information processing apparatus other than an image forming apparatus.

That is, for example, it may be configured by using a network scanner, a server, or the like, which separately-connects with the scanner with USB, or the like.

Also, the configuration and operation of the above-mentioned embodiment are examples, and it cannot be overemphasized that it can change suitably and can execute in the range that does not deviate from the aim of the present invention.

What is claimed is:

1. An image forming system having a portable terminal and an image forming apparatus, wherein
   the portable terminal comprises:
   an information selecting part configured to select browsing information, which is possible to be printed on the image forming apparatus, corresponding to a specified condition from the information which the user is browsing in order to browse when the portable terminal is unusable, and
   an information transmission part configured to transmit the browsing information selected by the information selecting part to the image forming apparatus;
   the image forming apparatus comprises:
   an information accumulation part configured to accumulate the browsing information received from the portable terminal,
   an image forming part configured to print the browsing information accumulated by the information accumulation part, and
   a storage part; and
   the information accumulation part
   stores the browsing information in the storage part when a storage capacity of the storage part is greater than or equal to a specific value, and
   transmits the browsing information to an external server when the storage capacity is less than the specific value.

2. The image forming system according to claim 1, further comprising
   a key generating part configured to generate key information per user and/or per portable terminal, wherein
   when the key information is acquired, the browsing information is printed by the image forming part.

3. The image forming system according to claim 1, wherein
   the browsing information is screen shot image data or electronic document data, and
   the information selecting part selects the screen shot image data or the electronic document data as the browsing information when the user performs a search by a specific application.

4. The image forming system according to claim 1, wherein
   the browsing information corresponding to the specified condition is any one or arbitrary combination of information of navigation, an electronic ticket, a coupon, an account code, a confirmation screen, and information selected by user instruction.

5. An image forming method executed by an image forming system having a portable terminal and an image forming apparatus, comprising the steps of:
   by the portable terminal, selecting browsing information, which is possible to be printed on the image forming apparatus, corresponding to a specified condition from the information which the user is browsing in order to browse when the portable terminal is unusable;
   by the portable terminal, transmitting the selected browsing information to the image forming apparatus;

by the image forming apparatus, accumulating the browsing information received from the portable terminal;
by the image forming apparatus, printing the accumulated browsing information;
by the image forming apparatus, storing the browsing information in a storage part of the image forming apparatus when a storage capacity of the storage part is greater than or equal to a specific value, and
by the image forming apparatus, transmitting the browsing information to an external server when the storage capacity is less than the specific value.

6. The image forming method according to claim 1, further comprising a step of
generating key information per user and/or per portable terminal, wherein
when the key information is acquired, the browsing information is printed by the image forming apparatus.

7. The image forming method according to claim 1, wherein
the browsing information is screen shot image data or electronic document data, and
selecting the screen shot image data or the electronic document data as the browsing information when the user performs a search by a specific application.

8. The image forming method according to claim 1, wherein
the browsing information corresponding to the specified condition is any one or arbitrary combination of information of navigation, an electronic ticket, a coupon, an account code, a confirmation screen, and information selected by user instruction.

* * * * *